Sept. 3, 1929.  T. W. W. FORREST  1,726,816
HOT FRUIT COOLING AND TREATING APPARATUS
Filed June 17, 1925
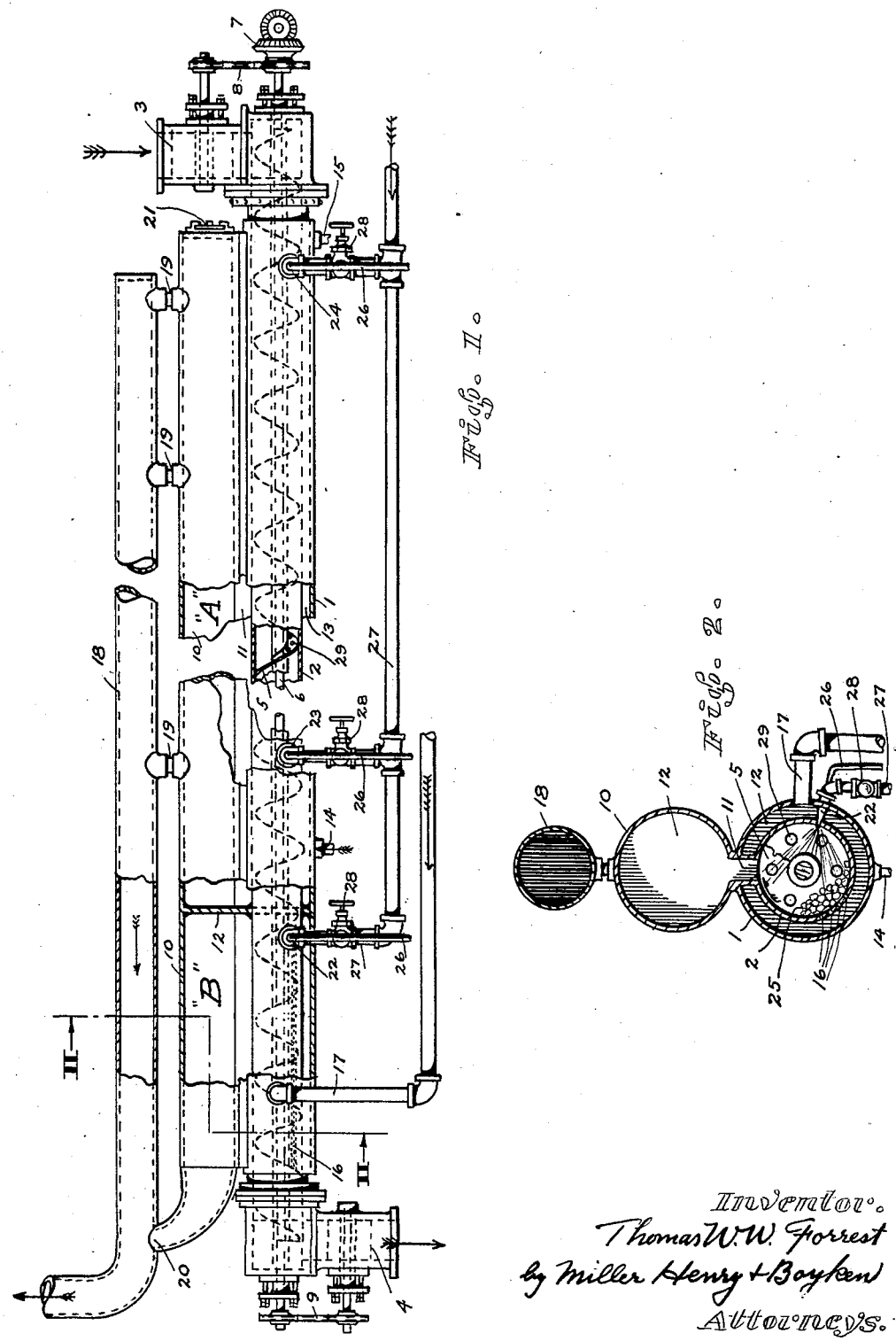

Patented Sept. 3, 1929.

1,726,816

UNITED STATES PATENT OFFICE.

THOMAS W. W. FORREST, OF OAKLAND, CALIFORNIA, ASSIGNOR TO SUN MAID RAISIN GROWERS OF CALIFORNIA, OF FRESNO, CALIFORNIA, A COOPERATIVE ASSOCIATION OF CALIFORNIA.

HOT-FRUIT COOLING AND TREATING APPARATUS.

Application filed June 17, 1925. Serial No. 37,678.

This invention relates to apparatus for cooling and treating hot dried fruit, especially such fruit as has been previously rendered hot by my process of treating dried fruit, described in my copending application filed under Serial No. 37,676 on June 17, 1925.

The object of the invention is to provide means for carrying out the above mentioned process in which the cooling of the fruit must be carried out in stages in order to secure the best results as well as the provision of means for treating the fruit with oil during the cooling of the same.

In the drawings hereto the preferred form of my invention is illustrated and in which drawing Figure 1 is a side elevation of the apparatus while Figure 2 is an enlarged cross section of Figure 1 taken along the line 2—2 thereof.

Briefly described the apparatus comprises a long horizontally arranged cylinder through which the fruit is conveyed and variously treated in transit, while at both ends of the cylinder are sealing gates respectively arranged for admitting and discharging fruit to and from the cylinder while preserving the cylinder substantially closed against the outer atmosphere.

In practice several cylinders are used in order to control the various temperatures and gases used in the treatment of the fruit.

In further detail the drawings show at 1, an outer horizontally arranged cylindrical tube or chute, in practice of about 30 feet in length by a foot in diameter, and spacedly arranged within which is an inner cylinder 2 of about 9 inches in diameter.

The inner cylinder is sealed from the outer cylinder and at both ends the inner cylinder communicates with a sealing gate 3 and 4 for respectively delivering and removing fruit to the inner cylinder.

Within the inner cylinder is rotatively mounted a spiral conveyor 5 for conveying the fruit from one gate 3, and through the cylinder to the opposite or discharge gate 4.

The conveyor is mounted on a shaft 6 which projects through both ends of the conveyor housing for bearing support and to support at one end the pulley or gear 7 for driving the conveyor.

The gates 3 and 4 may be of any type of construction which will constantly pass fruit in and out of the cylinder, and are here shown as of the well known revolving type driven by chain or other gearing 8 and 9 respectively from some common power source, such as the conveyor shaft 6, so as to have a proper capacity relation to the installation.

Above the outer cylinder 1 is another cylinder 10 of about the same diameter extending substantially the full length thereof. This cylinder 10 is open to the inner cylinder 2 only along the length of cylinder 10 through a slot or elongated passage 11 and constitutes a header for the inner cylinder.

This header 10 and lower outer cylinder 1 are divided by a vertical baffle or wall 12, cutting off the lower intercylinder space 13 into two separate compartments, the first one A being relatively long from the receiving end of the cylinder, and the other B at the discharge end being relatively short or about one sixth of the total length.

In the section A, no communication exists between cylinders 1 and 2 and the long space between them is used for circulating water entering at pipe 14 and discharging at pipe 15.

In the shorter section B, the inner cylinder is perforated with very fine holes along a zone at one side near the bottom as indicated at 16, in Figure 1, and more clearly in Figure 2, and a pipe 17 extending through the opposite side of the outer cylinder delivers a refrigerant gas, such as air under low pressure, to the short intercylinder space for expansion through the perforations 16 into the inner cylinder.

Above the header 10 extends a common exhaust pipe 18, communicating at points 19 with the long compartment of the header 10 and at 20 with the shorter compartment.

This pipe is exhausted by any suitable means not shown, so as to draw off the vapors from the hot fruit entering the long section A of the conveyor and the expanding refrigerant from the short section B.

Since it is the intention to cool hot fruit in the apparatus practically free from moist vapor, an air inlet control gate 21 is arranged at the end of the header so that a small amount of air can be admitted to the header to start a draft therethrough to the header and thus siphon off, as it were, the attenuated moist vapors from the fruit.

At several points along the conveyor are arranged atomizers 22, 23 and 24 for atomizing a mineral oil more or less directly upon the fruit 25, and inside of the conveyor, as indicated in Figure 2, the oil entering the atomizer head through pipe 26 and the atomizing air pressure pipe being indicated at 27 with its control valve at 28.

The spiral conveyor is perforated throughout its length with holes (about 1⅛" diameter at about 4" centers) as shown at 29 and in rotation of the conveyor in direction of the arrow (Figure 2) the fruit banks up on one side of the cylindrical casing 2 directly over the perforations 16 so that the refrigerant gas expands directly within the body of fruit.

In operation, previously heated fruit, such for instance as hot raisins from the seeder, which it is desired to subject to the controlled cooling and treatment of the apparatus, enters the conveyor in a regulated delivery through the gate 3 to long compartment A where it is agitated by the conveyor and moved along in contact with the water cooled walls of the cylinder while the heated and moist vapors are withdrawn through the suction of the header; and the temperature of the circulating water being gradually raised as it circulates toward the receiving end of the conveyor the fruit is not suddenly chilled but suffers only a very gentle progressive extraction of its heat as it passes to the cooler end of the long compartment, then when it enters the shorter section B, it is more rapidly dropped in temperature with a very quick lowering thereof as it nears the main point of entrance of the refrigerating gas which blows through it from the pipe 17.

In the case of raisins the amount of refrigerant expanded should be such as to drop the temperature of the raisins to substantially that of the atmospheric air of the operating room, so they may be packed without sweating.

The relatively large perforations 29 in the conveyor are for the purpose of permitting a certain percentage of the conveyed fruit to pass through and thus promote a tumbling action throughout the fruit insuring its turning over and over, and the perforations large enough to pass the fruit are found to be a very superior way of accomplishing this without injury to the fruit as sometimes occasioned by a notched conveyor.

The application of oil to the fruit is seen to be at the beginning of the gentle cooling zone, near the end of the gentle cooling zone, and at the beginning of the rapid cooling zone; and while more or less points of application of the oil may be found useful with various varieties of fruit the arrangement described is found good for raisins in carrying out my process referred to.

The oil thus applied, not only improves the quality of the fruit as more particularly pointed out in my copending application referred to, but also lubricates the inside of the conveyor casing and the spiral flights so that the fruit is more easily conveyed along and the flight also more easily revolves against the casing wherever it may contact the same.

In contemplating the above description it will readily be seen that various lengths, diameters, capacities, etc. may be given the various elements, also that other conveying means apart from a specific spiral conveyor may be used, and that the conveyor may be run at any speed dependent on the requirement of the fruit to be treated.

I claim:

1. Fruit treating apparatus of the character described comprising an enclosed tubular casing, a conveyor mounted in the casing adapted to convey heated fruit therethrough, means for applying a cooling agent to the exterior of the casing adapted for gently cooling the fruit during the first portion of its travel through the conveyor, and means for applying a cooling agent to the exterior of the casing adapted for more rapidly cooling the fruit at the terminating portion of its travel including a nozzle directing a refrigerant gas directly upon the fruit for expansion thereupon.

2. Fruit treating apparatus of the character described comprising an enclosed tubular casing, a conveyor mounted in the casing adapted to convey heated fruit therethrough, means for applying a cooling agent to the exterior of the casing adapted for gently cooling the fruit during the first and major portion of its travel through the conveyor, and means for applying a cooling agent to the exterior of the casing adapted for more rapidly cooling the fruit at the termination and minor portion of its travel including a nozzle directing a refrigerant gas directly upon the fruit for expansion thereupon.

3. An apparatus for treating dried fruit comprising a conveyor casing, a conveyor therein adapted for conveying fruit therethrough while agitating and turning over the same, and a plurality of spaced atomizers directed into the casing arranged and adapted for controlling and atomizing blasts of oil to the fruit at a plurality of points along said conveyor during the operation of the conveyor.

4. An apparatus of the character described including a cylindrical casing, a spiral conveyor adapted for conveying dried fruit therethrough while agitating and turning over the same, and an atomizer adapted and arranged for ejecting and controlling an atomized blast of oil within said casing during the operation of the conveyor.

5. Apparatus for treating fruit comprising an elongated enclosure, a conveyor extending within the enclosure adapted for conveying dried fruit therethrough, sealing gates at opposite ends of the conveyor adapted respectively for delivery and ejection of said fruit thereto and therefrom, suction means adapted for withdrawing vapor from said enclosure, and a gate adapted for controlled admission of the outside atmosphere to said enclosure for creating a draft to said suction means.

6. A structure as specified in claim 5 and said gate being positioned adjacent the receiving end of the conveyor only.

7. An apparatus of the character described including a spiral conveyor rotatably mounted in a casing, an outer casing spaced from the first mentioned casing, and a baffle wall separating the outer casing space into separate compartments.

8. A structure as specified in claim 7 provided with means for separately cooling the separate compartments.

9. An apparatus of the character described including a horizontally arranged spiral conveyor operatively mounted in a cylindrical inner casing, a second casing outside of the inner casing and spaced therefrom, a cylindrical header extending along the conveyor communicating through the outer casing with the inner casing and a suction pipe communicating at spaced points with the space within said header.

10. A structure as specified in claim 9 wherein the communication of the header and inner casing is in the form of a slot defined by walls extending through said outer casing.

THOMAS W. W. FORREST.